(12) United States Patent
Choi et al.

(10) Patent No.: US 8,941,627 B2
(45) Date of Patent: Jan. 27, 2015

(54) DRIVING A LIGHT SCANNER

(75) Inventors: Jung Hwan Choi, Seoul (KR); Jung Hoon Seo, Seoul (KR); Suhwan Kim, Seoul (KR); Jae Wook Kwon, Seoul (KR); Jae Sung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1568 days.

(21) Appl. No.: 12/421,672

(22) Filed: Apr. 10, 2009

(65) Prior Publication Data

US 2009/0278824 A1    Nov. 12, 2009

Related U.S. Application Data

(60) Provisional application No. 61/050,983, filed on May 6, 2008.

(30) Foreign Application Priority Data

Jul. 21, 2008 (KR) ........................ 10-2008-0070498

(51) Int. Cl.
*G09G 5/00* (2006.01)
*G09G 5/12* (2006.01)
*H04N 9/31* (2006.01)
*G02B 26/08* (2006.01)

(52) U.S. Cl.
CPC .............. *G09G 5/12* (2013.01); *G02B 26/0833* (2013.01); *H04N 9/3129* (2013.01); *H04N 9/3155* (2013.01)
USPC ........................................................ 345/204

(58) Field of Classification Search
USPC ........................... 345/204–215, 418; 358/518
See application file for complete search history.

(56) References Cited

U.S. PATENT DOCUMENTS

| | | | |
|---|---|---|---|
| 2001/0021953 A1* | 9/2001 | Nakashima | 710/5 |
| 2006/0164330 A1* | 7/2006 | Bright et al. | 345/7 |
| 2007/0176851 A1* | 8/2007 | Willey et al. | 345/32 |
| 2011/0025983 A1* | 2/2011 | Sprague et al. | 353/20 |

FOREIGN PATENT DOCUMENTS

| | | |
|---|---|---|
| JP | 06-342126 A | 12/1994 |
| JP | 15-131151 | 5/2003 |
| JP | 2008-116678 A | 5/2008 |

* cited by examiner

*Primary Examiner* — Dennis Joseph
(74) *Attorney, Agent, or Firm* — Fish & Richardson P.C.

(57) ABSTRACT

Driving a light scanner at a resonant frequency of the light scanner using a phase delay compensated driving signal.

9 Claims, 8 Drawing Sheets

DRIVING A LIGHT SCANNER

CROSS REFERENCE TO RELATED APPLICATIONS

This application claims the benefit of the Patent Provisional Application No. 61/050,983, filed on May 6, 2008 and Korean Application No. 10-2008-0070498, filed on Jul. 21, 2008 which are hereby incorporated by reference as if fully set forth herein.

FIELD

The present disclosure relates to driving a light scanner.

BACKGROUND

In general, following rapid advance to a multimedia society, a large sized display screen and high definition of an image are desired for many applications. In addition to high definition display, realization of natural colors has become important.

In order to realize natural color display, it is important to use a light source that has high color purity, like a laser light source. One device for realizing an image using a laser is a laser projection display device.

The laser projection display device realizes an image by scanning the light from a laser light source on a screen using a light scanner.

In this instance, the light scanner scans the light incident on the screen in a horizontal direction and a vertical direction in response to a driving signal for realizing the image.

To increase the definition of an image to be displayed, the driving speed of the light scanner can be increased. One approach to increasing the light scanner driving speed is to increase the driving angle of the light scanner.

The light scanner tends to have a large driving angle at a time when the driving signal has a particular frequency. The particular frequency of the driving signal that causes the driving angle of the light scanner to be large is called the "resonant frequency."

SUMMARY

In one general aspect, an apparatus for driving a light scanner for scanning an image to a screen includes a reference signal generating unit configured to detect a phase difference between a driving signal for driving the light scanner and a sensed signal, and configured to generate a reference signal based on the detected phase difference, a phase delay compensating unit configured to detect a phase delay between the generated reference signal and the sensed signal and configured to generate a compensated signal based on the detected phase delay, and a driving signal generating unit configured to generate the driving signal based on the compensated signal.

The apparatus may further include a sensing unit for sensing configured to generate the sensed signal based on an operating characteristic of the light scanner, and an amplification control unit configured to control amplification of the driving signal generated by the driving signal generating unit based on the sensed signal sensed at the sensing unit.

The amplification control unit may include a reference voltage generating unit configured to generate a reference voltage based on data from the driving signal generating unit, a calculation unit configured to calculate a difference value between the generated reference voltage value and a voltage value of the sensed signal, and a control unit configured to control amplification of the driving signal generated by the driving signal generating unit based on the calculated difference valve.

The calculation unit can include a first calculation unit configured to calculate a difference value between a reference voltage of a horizontal synchronizing signal and a sensed voltage of the horizontal synchronizing signal, a second calculation unit configured to calculate a difference value between a reference voltage of vertical synchronizing signal and a sensed voltage of the vertical synchronizing signal, a third calculating unit configured to integrate a value calculated at the first calculating unit, and a fourth calculating unit configured to integrate a value calculated at the second calculating unit.

The amplification control unit can include a reference angle setting unit configured to set a reference angle based on the data from the driving signal generating unit, a calculation unit configured to calculate a difference between the reference angle and a drive angle of the light scanner sensed by the sensing unit, and a control unit configured to control amplification of the driving signal from the driving signal generating unit based on the difference calculated by the calculation unit.

The reference signal generating unit can include a noise removing unit configured to remove noise from the sensed signal. A frequency adjusting unit sets a phase difference between the sensed signal and the driving signal from the driving signal generating unit to be approximately 90°, for adjusting a clock frequency, and a synchronizing signal adjusting unit for using the adjusted clock frequency as a pixel clock for adjusting vertical and horizontal synchronizing signals for an external image signal applied thereto to generate the reference signal. The noise removing unit may include a differential amplification unit for making differential amplification of the sensed signal to removing noise, and an offset adjusting unit for adjusting an offset of the sensed signal. The frequency adjusting unit may include a phase detection unit for detecting a 90° phase difference between the sensed signal and the driving signal from the driving signal generating unit. A loop filter unit provides a control voltage having a limited frequency component of the detected phase difference, and a voltage control oscillation unit for generating a frequency relevant to the control voltage.

The reference signal generating unit can additionally include a first square wave converting unit connected between the noise removing unit and the frequency adjusting unit and configured to convert a signal applied thereto into a first clock signal, and a second square wave converting unit connected between the drive signal generating unit and the frequency adjusting unit and configured to convert a signal applied thereto into a second clock signal.

The phase delay compensating unit may include a detection unit for detecting a phase delay between the reference signal and the sensed signal sensed at the light scanner, a loop filter unit for providing a control voltage having a limited frequency component of the detected phase delay, and a compensating unit for compensating the phase delay of the reference signal in correspondence to the control voltage. The reference signal and the sensed signal provided to the detection unit can be clock signals. The reference signal can be converted to a clock signal by a clock converter, and the sensed signal can be converted to a clock signal by a square wave converter.

The driving signal generating unit may include a memory unit for storing the compensated reference signal having, a digital-analog converting unit for converting a reference signal stored in the memory unit from a digital signal into an analog signal, a filter unit for removing high frequency components from the analog signal, and a driving unit for driving the light scanner by using the generated analog driving signal. The driving signal generated at the filter unit can be provided to the reference signal generating unit.

The driving signal generating unit can also include a gain adjusting unit configured to adjust a gain of the reference signal stored in the memory unit based on a provided control signal.

In another general aspect, driving a light scanner includes detecting a phase difference between a driving signal and a signal sensed at the light scanner to generate a reference signal, detecting a phase delay between the generated reference signal and the sensed signal, compensating the phase delay to generate a compensated signal, and generating the driving signal based on the compensated signal.

Driving the light scanner can also include receiving an image signal generated outside of the light scanner, and generating an initial driving signal based on a synchronizing signal of the received image signal before detecting the phase difference.

Detecting the phase difference can include sensing an operating characteristic of the light scanner to generate the sensed signal, removing noise from the sensed signal, setting a phase difference between the sensed signal and the driving signal to approximately 90° for adjusting a clock frequency, and adjusting vertical and horizontal synchronizing signals of the image signal based on the adjusted clock frequency for generating the reference signal.

Detecting a phase delay can include detecting a phase delay between the generated reference signal and the sensed signal, providing a control voltage having a limited frequency component of the detected phase delay, and compensating the phase delay of the reference signal based on the control voltage.

Generating the driving signal includes storing the compensated reference signal, converting the stored reference signal into an analog signal, removing a high frequency component from the analog signal to generate the driving signal, and driving the light scanner by using the generated driving signal.

Additionally, after storing the compensated reference signal, a reference voltage value can be generated from the generated reference signal, a difference value between the generated reference voltage value and a voltage value of the sensed signal can be calculated, and amplification of the stored reference voltage can be controlled based on the calculated difference value.

Furthermore, after storing the compensated reference signal, a reference angle of the driving angle for the light scanner can be set based on the stored reference signal, a difference value of a driving angle for the light scanner and the reference angle can be calculated, and amplification of the stored reference signal can be controlled based on the calculated difference value.

DETAILED DESCRIPTION

In some embodiments, a laser light scanner is used to generate a video display. The quality of the display is controlled by driving the light scanner with a compensated driving signal. The compensated driving signal is generated by a driving apparatus based on a current driving signal and a signal sensed at the light scanner. Specifically, the phase of the driving signal is adjusted to maintain a 90 degree phase delay from a phase of the sensed signal.

Figure 1:
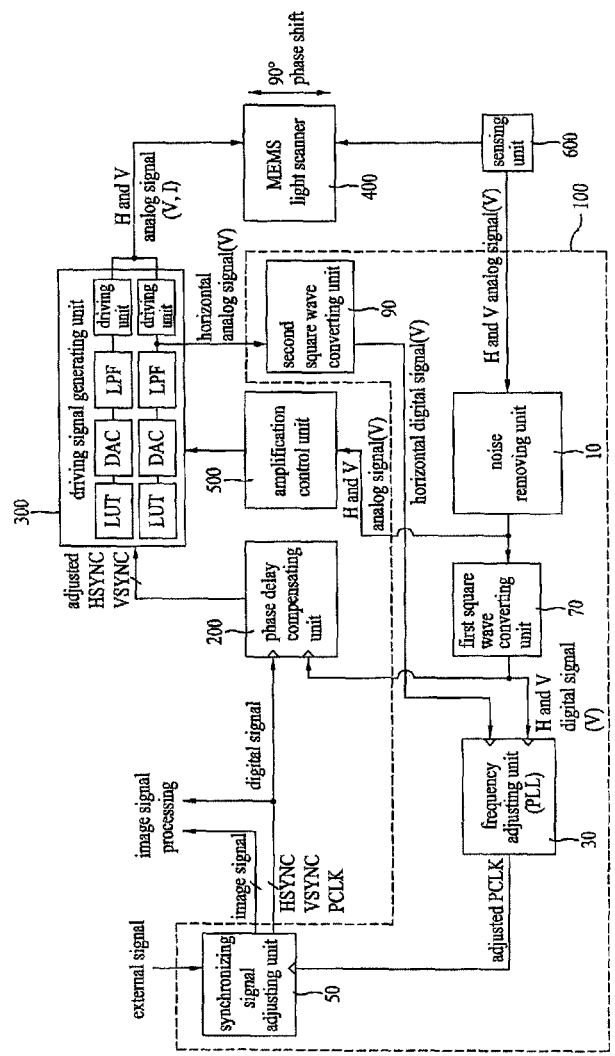
FIG. 1 illustrates a block diagram of an example driving apparatus for a light scanner.

Referring to FIG. 1, a driving apparatus for a light scanner includes a light scanner 400, a reference signal generating unit 100, a phase delay compensating unit 200, and a driving signal generating unit 300. The driving apparatus may further include a sensing unit 600 and an amplification control unit 500.

The light scanner 400 is a micro-electro-mechanical system (MEMS) scanner, which is resonated and driven by a driving signal phase shifted by 90°

The reference signal generating unit 100 detects a phase difference between the driving signal generated at the driving signal generating unit 300 and a sensed signal sensed at the sensing unit 600.

The reference signal generating unit 100 includes a noise removing unit 10, a frequency adjusting unit 30, a synchronizing signal adjusting unit 50, and a first and second square wave converting units 70 and 90.

The noise removing unit 10 removes noise from the sensed signal sensed at the sensing unit 600, and the frequency adjusting unit 30 maintains a phase difference between the sensed signal, having had the noise removed therefrom, and the driving signal from the driving signal generating unit 300 for adjusting a clock frequency.

The synchronizing signal adjusting unit 50 uses the adjusted clock frequency as a pixel clock for adjusting vertical and horizontal synchronizing signals for an external image signal. The adjusted vertical and horizontal synchronizing signals can be used to generate a reference signal.

Figure 3:
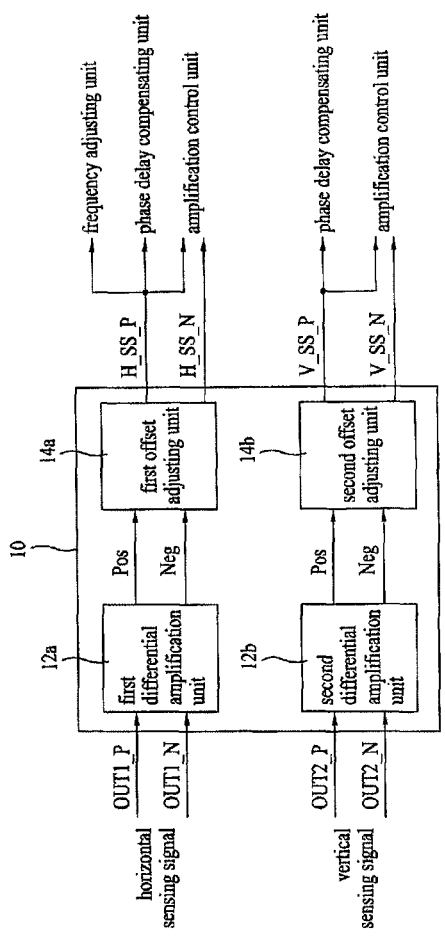
FIG. 3 illustrates a block diagram of an example noise removing unit.

Referring now to FIG. 3, the noise removing unit of FIG. 1 can include first and second differential amplification units 12a and 12b, and first and second offset adjusting units 14a and 14b.

The first differential amplification unit 12a receives a horizontal sensed signal for a horizontal drive synchronizing signal of the light scanner from the sensing unit 600, and makes differential amplification of the horizontal sensed signal for removing noise.

The second differential amplification unit 12b receives a vertical sensed signal for a vertical drive synchronizing signal of the light scanner from the sensing unit 600, and makes differential amplification of the vertical sensed signal for removing noise.

The first offset adjusting unit 14a adjusts an offset of the horizontal sensed signal differentially amplified by the first differential amplification unit 12a and provides an offset adjusted horizontal sensed signal to the frequency adjusting unit 30, the phase delay compensating unit 200, and the amplification control unit 500.

The second offset adjusting unit 14b adjusts an offset of the vertical sensed signal differentially amplified by the second differential amplification unit 12b and provides an offset adjusted vertical sensed signal to the phase delay compensating unit 200, and the amplification control unit 500.

Figure 4:
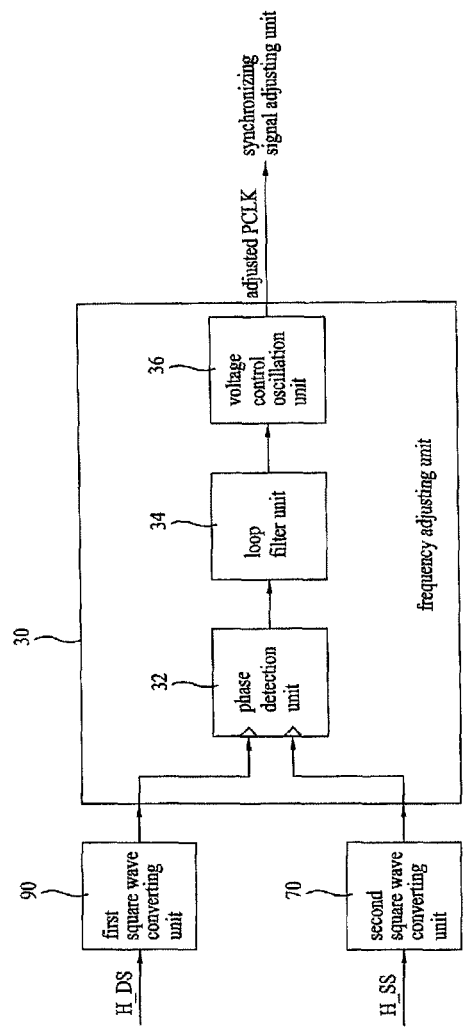
FIG. 4 illustrates a block diagram of an example frequency adjusting unit.

Now referring to FIG. 4, the frequency adjusting unit 30 of FIG. 1 can include a phase detection unit 32, a loop filter unit 34, and a voltage control oscillation unit 36. The phase detection unit 32 detects a 90° phase difference between the horizontal sensed signal (having had noise removed therefrom) and a horizontal driving signal from the driving signal generating unit 300.

The loop filter unit 34 provides a control voltage having a limited frequency component of the detected phase difference, and the voltage control oscillation unit 36 generates a frequency based on the control voltage and provides the frequency to the synchronizing signal adjusting unit 50.

Thus, the phase difference between the drive signal and the sensed signal is maintained at approximately 90° by the frequency adjusting unit 30 such that the light scanner 400 will have a large Q factor, which occurs when the horizontal drive signal from the drive signal generating unit 300, which is a reference signal, and the horizontal sensed signal of the light scanner 400, which is a compared signal, is approximately 90°.

The two signal applied to the phase detection unit 32 are clock signals and can be converted by zero crossing.

Thus, one of two signals applied to the phase detection unit 32 is the horizontal sensed signal, which is a digital signal received from the noise removing unit 10, which has been converted by the first square wave converting unit 70. The other signal applied to the phase detection unit 32 is the horizontal drive signal, which is a digital signal received from the drive signal generating unit 10, which is converted by the second square wave converting unit 90.

The output signal of the frequency adjusting unit 30 is provided to the synchronizing signal adjusting unit 50, and the synchronizing signal adjusting unit 50 uses the provided signal as a pixel clock to adjust the horizontal signal and the vertical signal for the external image signal provided to the synchronizing signal adjusting unit 50 to generate the reference signal.

In the reference signal generating unit 100, the first square wave converting unit 70, which is connected between the noise removing unit 10 and the frequency adjusting unit 30, performs zero crossing of a signal provided by the noise removing unit 10 to convert the signal into a clock signal. The second square wave converting unit 90, which is connected between the drive signal generating unit 300 and the frequency adjusting unit 30, performs zero crossing of a signal provided by the drive signal generating unit 300 to convert the signal into a clock signal.

The phase delay compensating unit 200 detects a phase delay between the reference signal provided by the synchronizing signal adjusting unit 50 of the reference signal generating unit 100 and the signal provided by the first square wave converting unit 70.

Figure 5:
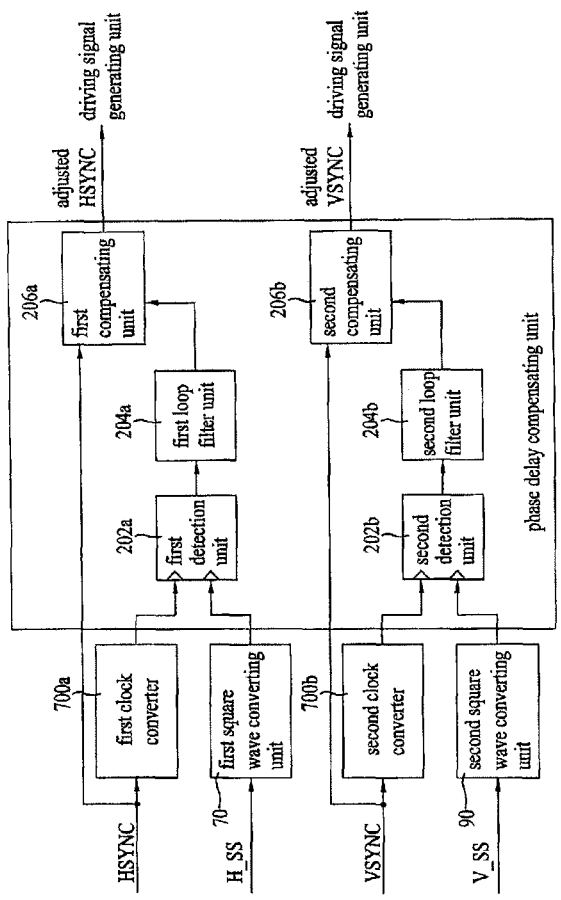
FIG. 5 illustrates a block diagram of an example phase delay compensating unit.

With reference to FIG. 5, the phase delay compensating unit 200 of FIG. 1 includes first and second detection units 202a and 202b, first and second loop filters 204a and 204b, and first and second compensating units 206a and 206b.

The first detection unit 202a detects the phase delay between the horizontal synchronizing signal and the horizontal sensed signal.

The horizontal synchronizing signal provided by the synchronizing signal adjusting unit 50 is converted into a clock signal at the first clock converter 700a. As discussed above, the horizontal sensed signal is converted into a clock signal by the first square wave converting unit 70.

The second detection unit 202b detects the phase delay between the vertical synchronizing signal and the vertical sensed signal.

The vertical synchronizing signal provided by the synchronizing signal adjusting unit 50 is converted into a clock signal at the second clock converter 700b. As discussed above, the vertical sensed signal is converted into a clock signal by the first square wave converting unit 70.

The first and second loop filter units 204a and 204b provide a control voltages having the limited frequency component of the phase delay detected at the first and second detection units 202a and 202b to the first and second compensating units 206a and 206b.

The first compensating unit 206a compensates the horizontal synchronizing signal of the reference signal for the phase delay with reference to the control voltage from the first loop filter unit 204a. The second compensating unit 206b compensates the vertical synchronizing signal of the reference signal for the phase delay with reference to the control voltage from the second loop filter unit 204b.

Additionally, the driving signal generating unit 300 uses the signal having compensated synchronizing signals of the first and second compensating units 206a and 206b to generate the driving signal.

Figure 6:
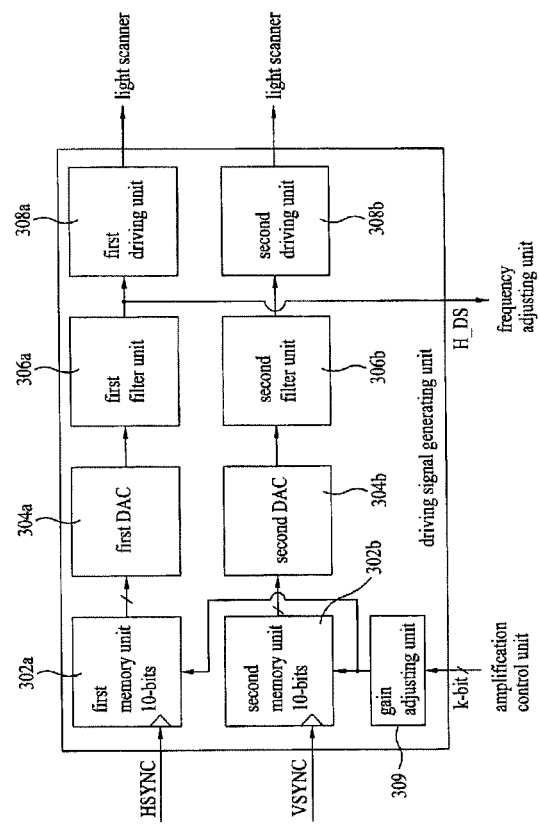
FIG. 6 illustrates a block diagram of an example driving signal generating unit.

Referring now to FIG. 6, the driving signal generating unit 300 of FIG. 1 includes first and second memory units 302a and 302b, first and second digital-analog converting units 304a and 304b, first and second filter units 306a and 306b, first and second drive unit 308a and 308b, and a gain adjusting unit 309.

The first and second memory units 302a and 302b include look-up tables for storing the phase delay compensated horizontal and vertical reference signals. Specifically, The first memory unit 302a stores data corresponding to the horizontal phased delay compensated synchronizing signal, and the second memory unit 302b stores data corresponding to the vertical phase delay compensated synchronizing signal.

The first and second digital-analog converting units 304a and 304b convert the phase delay compensated synchronizing signals stored in the first and second memory units 302a and 302b from digital signals into analog signals, and the first and second filter units 306a and 306b, which are, for example, low-pass filters, remove high frequency components from the analog signals.

The signal generated at the first filter unit 306a is provided to the frequency adjusting unit 30 of the reference signal generating unit 100.

The first and second driving units 308a and 308b drive the light scanner based on the signals provided by the first filter unit 306a and the second filter unit 306b, respectively.

The gain adjusting unit 309 adjusts a gain of the reference signals stored in the first and second memory units 302a and 302b in response to the control signal from the amplification control unit 500.

The amplification control unit 500 controls amplification of the driving signal generated at the driving signal generating unit 300 in response to the sensed signal passed through the sensing unit 600 and the noise removing unit 10 by adjusting the control signal provided to the gain adjusting unit 309.

Figure 2:
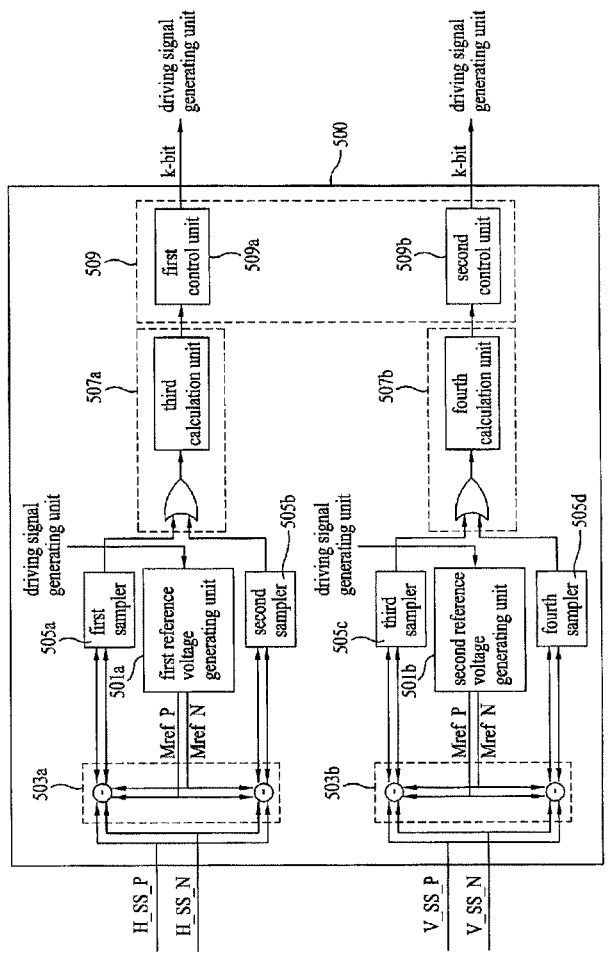
FIG. 2 illustrates a block diagram of an example amplification control unit.

Specifically, and with reference to FIG. 2, the amplification control unit 500 of FIG. 1 includes first and second reference voltage generating units 501a and 501b, first, second, third, and fourth calculation units 503a, 503b, 507a and 507b, first, second, third and fourth samplers 505a, 505b, 505c and 505d, and a control unit 509 having first and second control units 509a and 509b.

The first and second reference voltage generating units 501a and 501b generate reference voltages using the data from the driving signal generating unit 300.

The first calculation unit 503a calculates a difference value between the reference voltage of the horizontal synchronizing signal and a sensed voltage of the horizontal synchronizing signal. The second calculation unit 503b calculates a difference value between the reference voltage of the vertical synchronizing signal and a sensed voltage of the vertical synchronizing signal.

The first and second samplers 505a and 505b store the difference value from the first calculation unit 503a, and the third and fourth samplers 505c and 505d store the difference value from the second calculation unit 503b.

The third calculation unit 507a integrates a calculated value stored in the first and second samplers 505a and 505b, and the fourth calculation unit 507b integrates a calculated value stored in the third and fourth samplers 505c and 505d.

The control unit 509 controls the gain adjusting unit 309 in the driving signal generating unit 300, for controlling amplification of the driving signal.

The control unit 509 may control the gain adjusting unit 309 taking a zooming value into account for adjusting a size of the image.

Depending on the application, the amplification control unit 500 may be designed such that the amplification control unit 500 sets the driving angle of the light scanner to a constant value in controlling the amplification of the driving signal.

Figure 7:
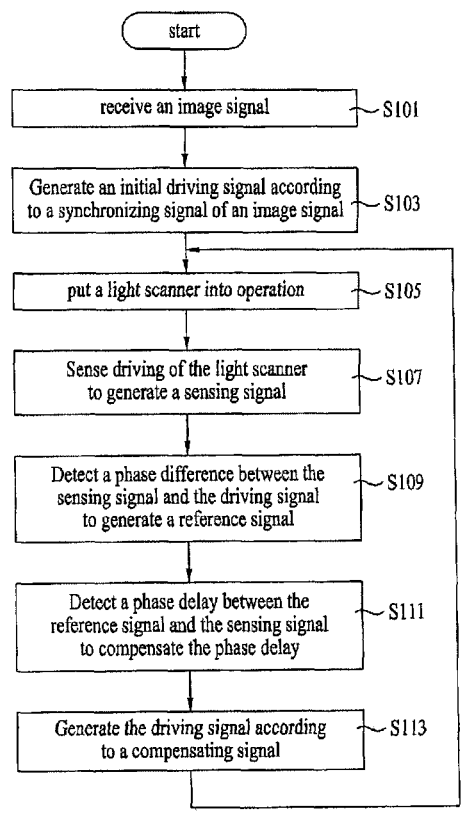
FIG. 7 illustrates a flow chart showing an example method for driving a light scanner.

Now referring to FIG. 7, a process for driving a light scanner includes, upon receiving an external image signal at a synchronizing signal adjusting unit 50, the synchronizing signal adjusting unit 50 separates the vertical and horizontal synchronizing signals of the image signal, and provides the image signal to an image processing unit which is external to the light scanner for processing the image signal, and providing the vertical and horizontal synchronizing signals to a driving signal generating unit 300 through the phase delay compensating unit 200 without phase delay. (S101)

Then, the driving signal generating unit 300 generates an initial driving signal in based the vertical and horizontal synchronizing signals provided by the synchronizing signal adjusting unit 50 for driving the light scanner 400. (S103)

Next, the light scanner 400 is driven by the driving signal. (S105).

The sensing unit 600 senses the driving of the light scanner 400 to generate a sensing signal. (S107)

Then, the noise removing unit 10 removes noise from the sensed signal generated at the sensing unit 600, and the signal having the noise removed therefrom is converted into a clock signal at a square wave converting unit 70.

Next, a frequency adjusting unit 30 sets a phase difference between the sensed signal having the noise removed therefrom and driving signal generated at the driving signal generating unit 300 to be 90°, for adjusting a clock frequency.

A synchronizing signal adjusting unit 50 uses the adjusted clock frequency as a pixel clock for adjusting the vertical and horizontal synchronizing signals of the image signal applied thereto to generate a reference signal. (S109).

Then, a phase delay compensating unit 200 detects a phase delay between reference signal generated thus and the sensed signal from the sensing unit 600 and compensates for the detected phase delay detected. (S111)

Next, the driving signal generating unit 300 generates the driving signal in response to a signal having the compensated phase delay for driving the light scanner 400. (S113)

Figure 8A:
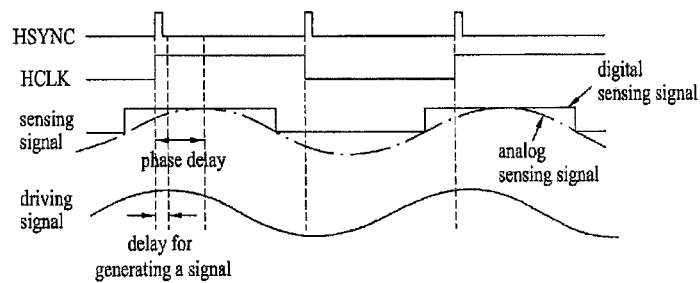
FIGS. 8A and 8B illustrate wave patterns for driving a light scanner.
Figure 8B:
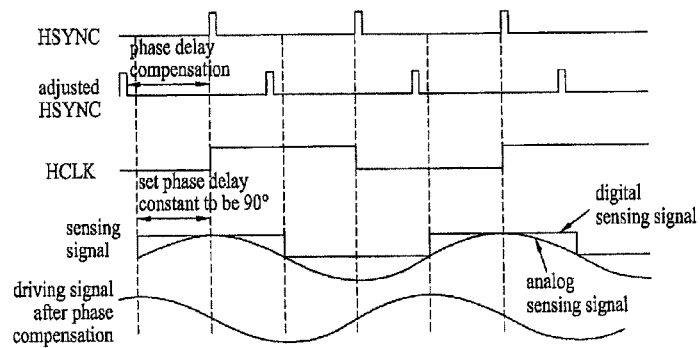

FIGS. 8A and 8B illustrate wave patterns for describing a process for driving a light scanner, wherein FIG. 8A illustrates a wave pattern of a driving signal for a light scanner having a phase delay, and FIG. 8B illustrates a wave pattern of a driving signal for a light scanner having a phase delay thereof compensated.

Referring to FIG. 8A, after generating the reference signal and the driving signal according to a horizontal synchronizing signal, the driving signal is applied to the light scanner.

Then, driving of the light scanner is sensed, and the sensed signal is compared to the driving signal to detect a phase delay.

Referring to FIG. 8B, the horizontal synchronizing signal is compensated for the detected phase delay to generate a reference signal and a compensated driving signal, respectively, and the compensated driving signal is applied to the light scanner.

In this instance, at the time of initial compensation, though the sensed signal is slower than the compensated synchronizing signal, at the time of compensation done thereafter, since the sensed signal may be slower or faster than the compensated synchronizing signal, it is required to adjust the driving signal according to corresponding phase delay.

Thus, distortion of an image can be reduced by detecting a phase difference between the driving signal and the sensed signal sensed at the light scanner to generate a reference signal, and compensating a phase delay between the reference signal and the sensed signal sensed at the light scanner to generate a driving signal.

Many of the concepts discussed above have particular applicability in scenarios where a large light scanner driving angle is desired. Typically, the driving angle becomes the greatest, enabling the high speed driving of the light scanner, when the driving signal has the resonant frequency.

However, since the light scanners are manufactured with varying resonant frequencies, it is very difficult to generate a driving signal having the resonant frequency of a given light scanner because the variation introduced by a fabrication process must be taken into account.

Besides the variation caused by the fabrication process, the resonant frequency of the light scanner can vary with intensity of the light incident on the light scanner. That is, since the intensity of the light incident on the light scanner is not consistent, the temperature of the light scanner varies with time. The resonant frequency of the light scanner varies with the temperature, and, therefore, varies with time.

Thus, if the driving signal is generated and applied to the light scanner without taking the resonant frequency varied thus into account, the image scanned by the light scanner will include distortion.

To avoid or reduce distortion of an image produced by a light scanner, the light scanner can be driven using a driving signal generated by compensating a phase delay between a reference signal and a sensed signal, where the reference signal is generated by detecting a phase difference between a driving signal and the sensed signal sensed at the light scanner.

It will be understood that various modifications and variations can be made without departing from the claims. For example, the amplification control unit 500 can include a reference angle setting unit, a calculation unit and a control unit. The reference angle setting unit can set a reference angle of a driving angle of the light scanner using data from the driving signal generating unit. The calculation unit can calculate an actual difference between the reference angle and the drive angle of the light scanner sensed at the sensing unit, and the control unit can control the gain adjusting unit in the driving signal generating unit with based on the difference value from the calculation unit. Accordingly, other implementations are within the scope of the claims.

What is claimed is:

1. A light scanner driving apparatus, comprising:
   a reference signal generating unit configured to detect a phase difference between a driving signal for driving the light scanner and a sensed signal and configured to generate a reference signal based on the detected phase difference;
   a phase delay compensating unit configured to detect a phase delay between the generated reference signal and the sensed signal and configured to generate a compensated signal based on the detected phase delay; and
   a driving signal generating unit configured to generate the driving signal based on the compensated signal,
   wherein the reference signal generating unit includes:
      a noise removing unit configured to remove noise from the sensed signal,
      a frequency adjusting unit configured to set a phase difference between the sensed signal and the driving signal to approximately 90°, and adjust a clock frequency, and
      a synchronizing signal adjusting unit configured to adjust vertical and horizontal synchronizing signals of an external image signal based on the adjusted clock frequency to generate the reference signal,
   wherein the synchronizing signal adjusting unit is configured to perform a primary adjustment of vertical and horizontal synchronizing signals of the external image signal using the adjusted clock frequency as a pixel clock and generate the reference signal,
   wherein the phase delay compensating unit is configured to perform a secondary adjustment of the primary adjusted reference signal using the detected phase delay and generate the compensated signal, and
   wherein the secondary adjustment of the primary adjusted reference signal is performed by detecting a phase delay between the primary adjusted reference signal and the sensed signal, providing a control voltage having a limited frequency component of the detected phase delay, and compensating the phase delay of the primary adjusted reference signal based on the control voltage.

2. The apparatus of claim 1, further comprising;
   a sensing unit configured to generate the sensed signal based on an operating characteristic of the light scanner; and
   an amplification control unit configured to control amplification of the driving signal generated by the driving signal generating unit based on the sensed signal sensed at the sensing unit.

3. The apparatus of claim 2, wherein the amplification control unit includes;
   a reference voltage generating unit configured to generate a reference voltage based on data from the driving signal generating unit,
   a calculation unit configured to calculate a difference value between the generated reference voltage value and a voltage value of the sensed signal, and
   a control unit configured to control amplification of the driving signal generated by the driving signal generating unit based on the calculated difference valve.

4. The apparatus of claim 2, wherein the amplification control unit includes;
   a reference angle setting unit configured to set a reference angle based on the data from the driving signal generating unit,
   a calculation unit configured to calculate a difference between the reference angle and a drive angle of the light scanner sensed by the sensing unit, and
   a control unit configured to control amplification of the driving signal from the driving signal generating unit based on the difference calculated by the calculation unit.

5. The apparatus of claim 1, wherein the frequency adjusting unit includes;
   a phase detection unit configured to detect a 90° phase difference between the sensed signal and the driving signal,
   a loop filter unit configured to provide a control voltage having a limited frequency component of the detected phase difference, and
   a voltage control oscillation unit configured to generate a frequency based on the control voltage.

6. The apparatus of claim 1, wherein the reference signal generating unit further includes;
   a first square wave converting unit connected between the noise removing unit and the frequency adjusting unit and configured to convert a signal applied thereto into a first clock signal, and
   a second square wave converting unit connected between the drive signal generating unit and the frequency adjusting unit and configured to convert a signal applied thereto into a second clock signal.

7. The apparatus of claim 1, wherein the driving signal generating unit includes;
   a memory unit configured to store the compensated reference signal,
   a digital-analog converting unit configured to convert a reference signal stored in the memory unit from a digital signal into an analog signal,
   a filter unit configured to remove high frequency components from the analog signal, and
   a driving unit configured to drive the light scanner by using the analog signal.

8. The apparatus of claim 7, wherein the driving signal generated at the filter unit is provided to the reference signal generating unit.

9. The apparatus of claim 7, wherein the driving signal generating unit further includes a gain adjusting unit configured to adjust a gain of the reference signal stored in the memory unit based on a provided control signal.

* * * * *